Patented Nov. 7, 1939

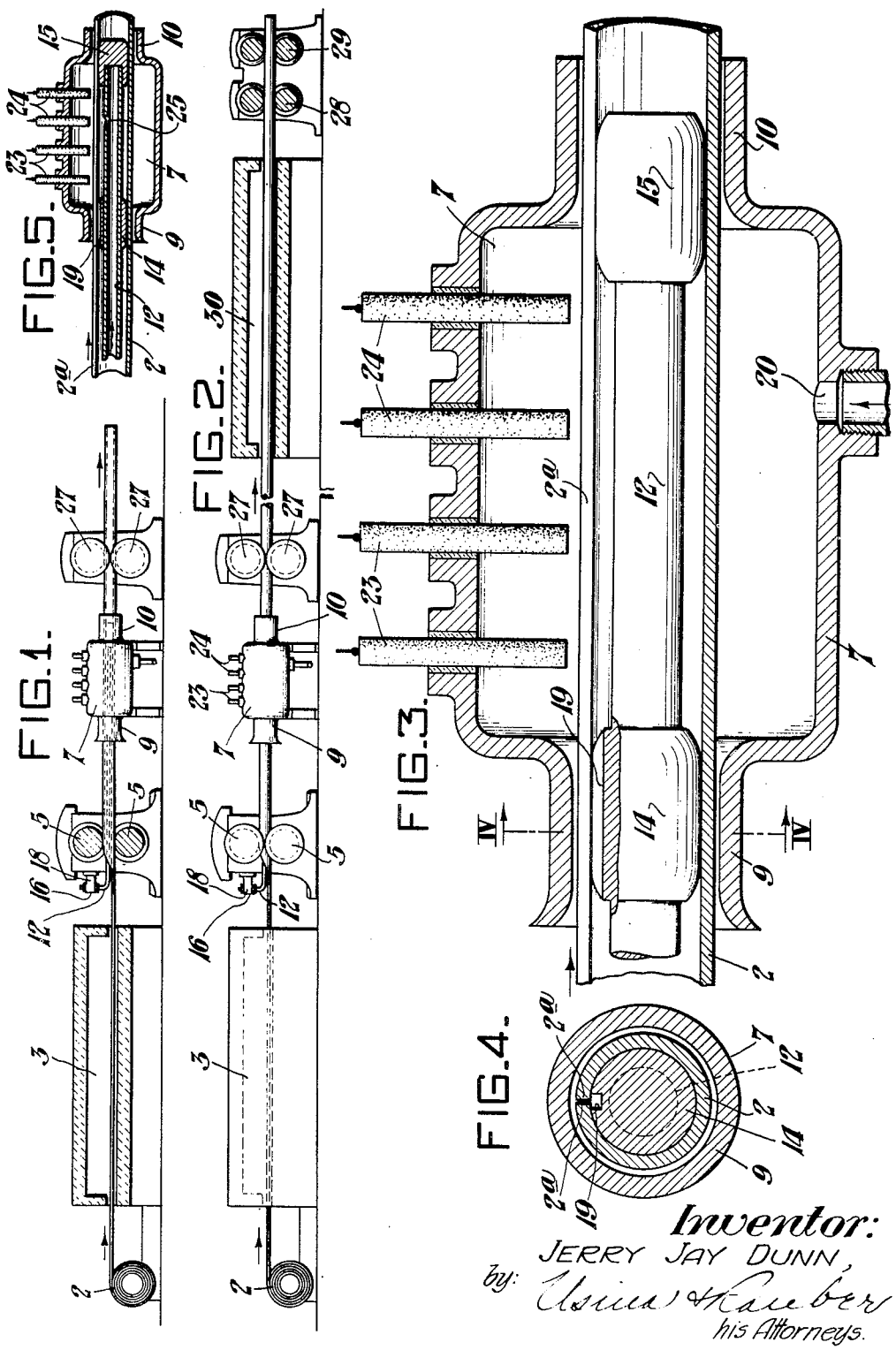

2,179,176

UNITED STATES PATENT OFFICE 2,179,176

APPARATUS FOR WELDING PIPES AND TUBES

Jerry Jay Dunn, Ellwood City, Pa., assignor to National Tube Company, a corporation of New Jersey Application March 1, 1937, Serial No. 128,515

5 Claims. (Cl. 219—6)

This invention relates to welding, and more particularly to the welding of skelp into pipes and tubes.

In the welding of metals, such as pipe or tube skelp, the quality of the weld obtained depends in a large measure on the removal of the oxides present on the surfaces to be united. This may be done by raising the temperature sufficiently high to liquefy the oxides, which are then forced from the edges to be united by the welding pressure. The preferable manner of controlling the oxides, however, is to reduce them by the action of gases which have a strong affinity for oxygen. In order for either of these methods to be commercially practicable, they must be carried out with great rapidity. The rate at which the reactions proceed is determined by the law of "mass action", and can be increased by increasing the partial pressure of the active agent and its relative concentration. Moreover, if the operation is to be economical, it is necessary to restrict the conditioning action to the surfaces to be welded.

It is among the objects of the present invention to provide an apparatus for welding pipes and tubes which is characterized by producing results of very high quality.

Another object is to obtain high quality welds in a rapid and economical manner.

The foregoing and other objects will be apparent after referring to the drawing, in which:

Figure 1 is an elevation of the apparatus of the invention;

Figure 2 is a view similar to Figure 1 but disclosing a modification;

Figure 3 is an enlarged sectional elevation of a detail;

Figure 4 is a sectional view on the line IV—IV of Figure 3; and,

Figure 5 is a view similar to Figure 3, reduced in size, disclosing another modification.

Referring more particularly to the drawing, in which I have illustrated a preferred embodiment of the apparatus of the invention as applied to the manufacture of pipes and tubes, the numeral 2 designates a continuous strip of metallic skelp which is drawn through a suitable heating furnace 3. This heating furnace 3 is heated to a temperature suitable for forming the metallic skelp as it passes thereto prior to the welding operation, and contains a maintained, inert, or reducing atmosphere. At the exit end of the heating furnace 3 there is positioned a suitable device for forming the metallic skelp 2 into a tubular section, and is shown in the present instance as comprising a pair of conventional forming rolls 5, although any other forming device, such as a die, may be substituted therefor. As soon as the skelp 2 has been heated to a temperature suitable for forming while passing through the heating furnace 3, the forming rolls 5 shape it into a tubular section with its edges 2a in closely abutted relationship.

In those instances where the width and wall thickness of the skelp are such as to make cold-forming economical, this may be done prior to the passage of the metallic skelp 2 through the heating furnace 3.

In order to better prepare the abutted edges 2a of the skelp 2 for welding, I provide a novel combined deoxidizing and heating chamber 7 adjacent the exit side of the forming rolls 5. More specifically this combined deoxidizing and heating chamber 7 comprises a hollow body portion having reduced entry and exit ends 9 and 10, respectively, which conform rather closely to the outside diameter of the work-piece (i. e., in the present instance the skelp 2 is formed into tubular shape with its edges 2a in a closely abutted relationship). The length of the reduced entry and exit ends 9 and 10, respectively, is regulated to provide closely confined passages of substantial length in order to prevent the escape of a gaseous deoxidizing medium to be later described.

A tube or rod 12 is disposed to extend through the combined deoxidizing and heating chamber and carries a pair of cylindrical plugs 14 and 15 to prevent the escape of the gaseous deoxidizing medium through the interior of the workpiece. Therefore, the cylindrical plug 14 is disposed within the reduced entry end 9 of the combined deoxidizing and heating chamber 7, while the cylindrical plug 15 is disposed within the reduced exit end 10 thereof. The exteriors of these cylindrical plugs 14 and 15 conform rather closely to the interior of the work-piece.

Referring to Figure 1 of the drawing, the tube 12 may be extended substantially from the reduced entry end of the combined deoxidizing and heating chamber 7 and anchored, as at 16, to a suitable support 18 which is positioned in advance of the forming rolls 5.

The cylindrical plug 14 is longitudinally slotted, as shown at 19, on that portion of its exterior which is most adjacent the abutted edges 2a of the skelp 2.

The combined deoxidizing and heating chamber 7 is provided with an opening 20 for the introduction thereinto of a reducing (deoxidizing) or inert gaseous medium which is supplied from a suitable source (not shown). Thus, the gaseous deoxidizing medium is forced across the abutted edges 2ª of the skelp 2 at high velocity and for the most part passes out of the combined deoxidizing and heating chamber 7 through the longitudinal slot 19 in the cylindrical plug 14. The direction of flow of the gaseous deoxidizing medium is toward the cooler parts of the abutted edges 2ª of the skelp 2 so that gas uncontaminated by the products of the reaction between the gas and the iron, or iron oxides, crosses the hottest parts, thus increasing the rapidity of the reaction.

The combined deoxidizing and heating chamber 7 is shown as provided with two pairs of electrodes 23 and 24 which extend thereinto to terminate just short of the exterior of the skelp 2 at its abutted edges 2ª. These electrodes are constructed and arranged to heat the abutted edges 2ª of the skelp 2 to welding temperature by means of high frequency electric current supplied from a suitable source (not shown). It is to be noted that according to this construction the electric current is carried to and from the abutted edges 2ª of the skelp 2 cross an arc with the current flowing in the direction of and not across the seam. This avoids all the difficulties of moving contacts for communicating the current and makes possible a very high rate of heat input.

It will be readily understood that the number of pairs of electrodes which extend into the combined deoxidizing and heating chamber 7 may be varied according to conditions.

Referring to Figure 5 of the drawing, I have shown a modification which contemplates the introduction of the gaseous deoxidizing medium into the combined deoxidizing and heating chamber 7 through the tube 12 which carries the cylindrical plugs 14 and 15. According to this modification, that portion of the tube 12 which is within the combined deoxidizing and heating chamber 7 is apertured, as at 25, closely adjacent the abutted edges 2ª of the skelp 2, whereby the gas is blown directly thereacross and for the most part through the longitudinal slot 19 in the cylindrical plug 14. If desired, the longitudinal slot 19 in the cylindrical plug 14 may, according to a further modification, be eliminated and the gas permitted to exit through the opening 20 in the combined deoxidizing and heating chamber 7.

In operation, the formed skelp 2 with its abutted edges 2ª deoxidized and raised to welding temperature leaves the reduced end 10 of the combined deoxidizing and heating chamber 7 and is immediately passed through a pair of welding rolls 27. These welding rolls 27 are operated at a slightly higher rate of speed than the forming rolls 5 causing a tension in the formed skelp within the chamber 7. This tension, combined with the expansion localized at the abutted edges 2ª by the localized temperature increase, causes the edges to be tightly pressed together, shutting off the flow of the gas into the interior of the pipe or tube in the hottest region and effecting the initial welding. That is to say, the abutted edges 2ª of the formed skelp are pressed together while they are in the chamber 7 and, when so pressed together, the interior of the closed-edge skelp or pipe or tube is sealed against the flow of deoxidizing gas. This seal results from the conjoint effects of the closed edges of the skelp and the interiorly disposed plug 15. If the abutted edges 2ª of the formed skelp were not pressed together before they passed over the plug 15, then the deoxidizing gas would pass between the abutted edges and thus into the interior of that portion of skelp which had emerged from the outlet end of the chamber 7. It is particularly important that the abutted edges 2ª of the skelp be pressed together before they have passed over the plug 15, as the abutted edges are thus closed while in a highly heated and deoxidized condition. Therefore, the final and complete welding may be effected immediately after the exit of the closed-edge skelp or pipe or tube by the welding rolls 27 while the closed abutted edges 2ª are in a highly heated and completely deoxidized condition. It will be readily understood that several pairs of such welding rolls may be used instead of the single pair if the dimensions of the pipe or tube require it.

When it is desired to completely finish a pipe or tube in one continuous operation, sizing and straightening rolls may be provided, together with a flying shear or hot saw to cut the same to desired lengths.

Referring to Figure 2, I have shown another modification as comprising straightening rolls 28 and sizing rolls 29 which are positioned somewhat remote from the welding rolls 27 so that the metal of the pipe or tube may be allowed to cool to a temperature below the critical range. An additional heating chamber 30 similar to the chamber 3 may be provided for reheating the metal adjacent the welded seam to slightly above the critical range. The subsequent working of the metal at or slightly above the critical temperature in the sizing and straightening rolls 28 and 29, respectively, facilitates the recrystallization of the metal and increased grain refinement.

While I have shown and described several specific embodiments of my invention, it will be understood that I do not wish to be limited exactly thereto since various modifications may be made without departing from the scope of the invention, as defined by the following claims.

I claim:

1. Apparatus for deoxidizing the adjacent surfaces of a hollow work-piece comprising a chamber having spaced inlet and exit openings of substantial length and but slightly larger internal diameter than the external diameter of the work-piece, plugs of slightly smaller diameter than the internal diameter of the work-piece centrally disposed in said openings, at least one of said plugs having a slot disposed beneath the adjacent edges of the said work-piece, and means for supplying a gaseous fluid to said chamber.

2. Apparatus for simultaneously deoxidizing and heating the adjacent surfaces of a hollow work-piece comprising a chamber having spaced inlet and exit openings of substantial length and but slightly larger internal diameter than the external diameter of the work-piece, means within said chamber for electrically heating the adjacent surfaces of said work-piece to a welding temperature, plugs of a slightly smaller diameter than the internal diameter of said work-piece centrally disposed in said openings, at least one of said plugs having a slot disposed beneath the adjacent edges of said work-piece, and means for supplying a gaseous fluid to said chamber.

3. Apparatus for simultaneously deoxidizing and heating the adjacent surfaces of a hollow work-piece comprising a chamber having spaced inlet and exit openings of substantial length and but slightly larger internal diameter than the external diameter of the work-piece, spaced electrodes in said chamber adapted to direct a heating current longitudinally along said adjacent surfaces whereby they are raised to a welding temperature, plugs of a slightly smaller diameter than the internal diameter of said work-piece centrally disposed in said openings, at least one of said plugs having a slot disposed beneath the adjacent edges of said work-piece and means for supplying a gaseous fluid to said chamber.

4. Apparatus for deoxidizing and heating the opposed edge surfaces of a longitudinally moving hollow metallic work-piece having a longitudinally extending seam gap, said apparatus comprising a chamber having spaced inlet and exit openings through which the work-piece is adapted to move, at least one pair of electrodes extending into said chamber and disposed longitudinally with respect to the line of travel of the opposed edge surfaces of said work-piece and in alignment therewith but spaced therefrom, said electrodes being connected to a source of electric current to convey an electric current to and away from the opposed edge surfaces of said work-piece by means of an arc and cause the current to flow along the same intermediate said electrodes, means for directing a flow of deoxidizing gas across the opposed edge surfaces of said work-piece, and means for tensioning the portion of said work-piece in said chamber to bring the opposed edge surfaces into contact while in said chamber.

5. Apparatus for deoxidizing and heating the opposed edge surfaces of a longitudinally moving hollow metallic work-piece having a longitudinally extending seam gap, said apparatus comprising a chamber having spaced inlet and exit openings through which the work-piece is adapted to move, feed rolls adjacent the inlet opening of said chamber, delivery rolls adjacent the exit openings of said chamber, at least one pair of electrodes extending into said chamber and disposed longitudinally with respect to the line of travel of the opposed edge surfaces of said work-piece and in alignment therewith but spaced therefrom, said electrodes being connected to a source of electric current to convey an electric current to and away from the opposed edge surfaces of said work-piece by means of an arc and cause the current to flow along the same intermediate said electrodes, means for directing a flow of deoxidizing gas across the opposed edge surfaces of said work-piece, and means for tensioning the portion of said work-piece in said chamber to bring the opposed edge surfaces into contact while in said chamber, said means comprising means for rotating said delivery rolls at a higher rate of speed than said feed rolls.

JERRY JAY DUNN.